United States Patent [19]

Flower

[11] 4,165,194
[45] Aug. 21, 1979

[54] FRICTIONAL COUPLINGS

[76] Inventor: Ralph F. J. Flower, "Littledean" Bath Rd., Devizes, Wiltshire, England

[21] Appl. No.: 842,103

[22] Filed: Oct. 14, 1977

[30] Foreign Application Priority Data

Oct. 16, 1976 [GB] United Kingdom ............... 43078/76

[51] Int. Cl.² ............................................. F16B 21/00
[52] U.S. Cl. .................................... 403/320; 403/372; 403/229; 151/14 CS
[58] Field of Search ................. 403/372, 229, DIG. 6, 403/320; 267/180; 85/32 CS; 151/14 CS, 27

[56] References Cited

U.S. PATENT DOCUMENTS

| | | | |
|---|---|---|---|
| 1,800,254 | 4/1931 | Holmes | 403/229 X |
| 1,860,522 | 5/1932 | Arnold | 403/343 X |
| 2,586,646 | 2/1952 | Graham | 267/180 X |
| 3,033,622 | 5/1962 | Renner | 403/229 X |

FOREIGN PATENT DOCUMENTS

| | | | |
|---|---|---|---|
| 309081 | 8/1917 | Fed. Rep. of Germany | 403/372 |
| 275904 | 9/1951 | Switzerland | 403/DIG. 6 |

Primary Examiner—Andrew V. Kundrat
Attorney, Agent, or Firm—Emory L. Groff, Jr.

[57] ABSTRACT

A frictional coupling for a male member inserted in the bore of a female member, to couple together the two members when at a pre-determined axial position. The opposed surfaces of the male and female members define a clearance the radial dimension of which varies as the members are moved axially relative to one another. A frictional coupling element is provided in said clearance, which element comprises a strip of resilient material preformed into a helical coil of polygonal cross-section, such that the outer corners of the coil contact the bore of the female member and the inner flats contact the male member.

As the clearance is reduced by relative axial movement of the members, the element is deformed to restrain further movement therebetween.

10 Claims, 6 Drawing Figures

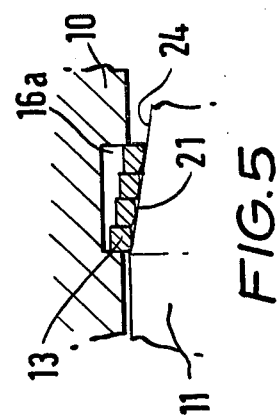
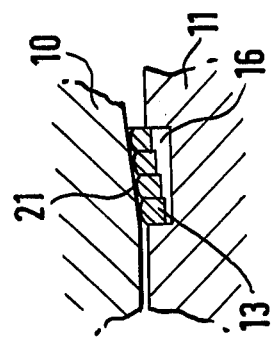
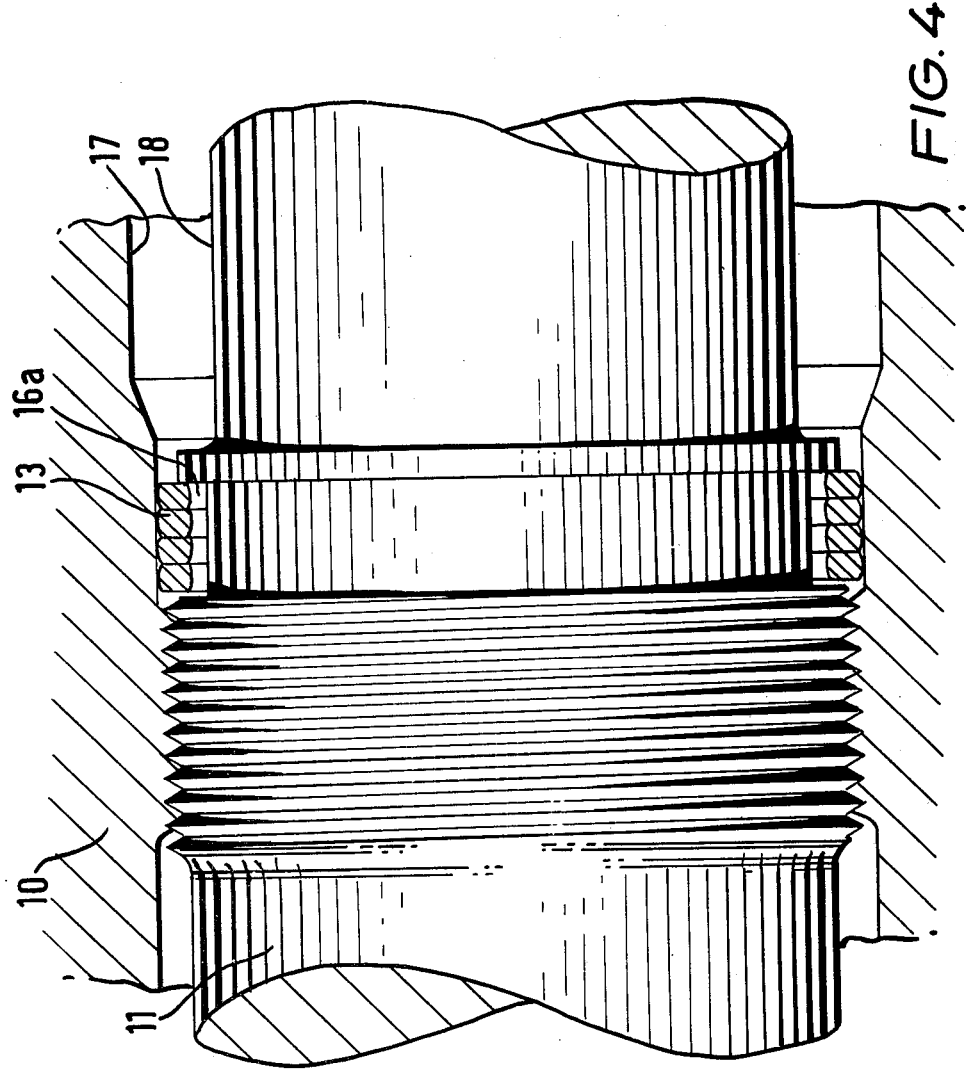

FRICTIONAL COUPLINGS

BACKGROUND OF THE INVENTION (a) Field of the invention.

This invention relates to improvements in couplings. More particularly, the invention concerns frictioncouplings adapted to resist and so far as possible to prevent relative rotational movement between a rotatable male member, such for instance as a shaft, and a bore in a female member within which it is axially movably located, such for instance as a bore in a hoursing, a cylinder, a bearing, an annulus or indeed other member capable of receiving such a male member.

(b) Description of the prior art.

Hitherto, friction-locking or friction-coupling devices have mostly been associated with the threaded portion of male and female members joined together by screw-threading, because of the difficulty in producing an effective friction-coupling between such members at non-threaded positions. Such an arrangement however not only restricts the location of the coupling device and introduces problems such as burring of the threads, but also the friction-coupling then must be precisely machined to fine tolerances so as to enable it to be properly located, and yet even then problems can still arise in locating the coupling. A friction-locking device has however been proposed in British Patent No. 1,393,257 which takes the form of an imperfect circle or ring, which is adapted to be interposed between rotatable members being coupled, and which holds or couples these members together frictionally through imperfections in the circle that provide points of frictional contact therewith.

OBJECTS OF THE INVENTION.

It is the principal object of the present invention to provide an improved and simplified construction of coupling for interfitting male and female members, which will enable the male and female members to be friction-coupled together more effectively than hitherto.

It is another object of the invention to allow male and female members to be frictionally coupled together at non-threaded portions thereof. A further object is to provide a coupling, the component parts of which do not need machining to fine tolerances in order to obtain a reliable frictional coupling.

SUMMARY OF THE INVENTION.

In accordance with these and other objects, this invention provides a coupling assembly which comprises in combination a female member including an axially-extending bore, a male member for coupling therewith positioned axially within the bore in said female member but spaced therefrom at least partially by a clearance between inner surfaces of the bore in the female member and outer surfaces of the male member and movable axially and except when coupled therewith rotatably relative thereto, a generally annular multicoil-shaped friction coupling member embracing the male member and accommodated within said clearance, means for retaining said multicoil-shaped friction coupling at a substantially fixed position relative to one of said male and female members, the opposed outer surfaces of the male member and inner surfaces of the female member being so formed that the clearance between them varies as the male and female members are moved axially relative to each other between a low-clearance location where the friction coupling member is forced into frictional engagement with the opposed surfaces of both the male and female members, so as thus frictionally to restrain relative rotational movement between the male and female members, and a high-clearance location where the friction coupling member is not in frictional engagement with at least one of said male and female members.

BRIEF DESCRIPTION OF THE DRAWINGS.

The invention will now be described in greater detail and certain preferred aspects and embodiments thereof given, reference being made to the accompanying drawings, in which:

FIG. 4 shows a side-elevational view, partly in cross-section, of another preferred embodiment of coupling assembly in accordance with the invention, basically similar to FIG. 1 but with certain refinements;

FIG. 5 shows a cross-sectional view of part of another preferred embodiment of multicoil-shaped friction coupling member, mounted in a groove in the bore of the female member of the coupling assembly, which illustrates the preformed profile imparted to the inner faces of the multicoil-shaped coupling member; and FIG. 6 shows a similar cross-sectional view of part of a still further preferred embodiment of coil-shaped friction coupling member, mounted in a groove in the male member of the coupling assembly, which illustrates the preformed profile-imparted to the outer faces of the multi-shaped coupling member.

Figure 1:
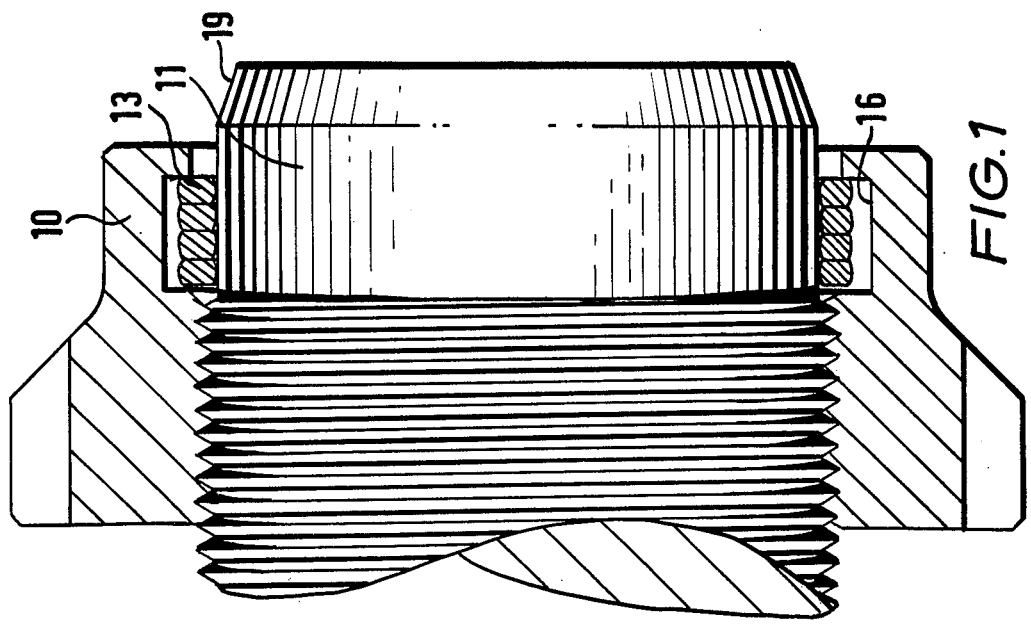
FIG. 1 shows a side-elevational view, partly in cross-section, of one preferred embodiment of coupling assembly in accordance with the invention, in which a multicoil-shaped friction coupling member is accommodated in the clearance between a bore in the female member and a shaft serving as the male member of the coupling assembly.

DESCRIPTION OF THE PREFERRED EMBODIMENTS.

In the coupling of this invention, the opposed surfaces of the male and female members which are to be frictionally-coupled together are so formed and arranged that the clearance between them varies according to pre-determined axial positions of these members relative to each other; and the multicoil-shaped friction coupling member, which is interposed in the clearance between them, is adapted to become operative by frictionally-engaging the opposed surfaces of the male and female members when the axial adjustment between them has created a low-clearance at the location of the friction coupling member, whereby the coupling member is forced into frictional engagement with both the male and female members.

The friction coupling member is interposed in the clearance between the male and female members preferably at non-threaded parts thereof—though that statement does not imply that there must necessarily be a screw-threaded union between them elsewhere.

Although this invention is not primarily concerned with the means by which the male and female members may be adjusted axially relative to each other, it may however be noted that such adjustment may conveniently be achieved by providing both the inner surfaces of the bore in the female member and the outer surfaces of the male member with screw-threaded portions which are threadedly interengaged, and then the multicoil-shaped friction coupling member is so disposed between the opposed non-threaded surfaces of the male and female members that it is forced into frictional engagement therewith as the threaded portions of the male and female members are screwed into engagement with each other.

In order to facilitate assembly and disassembly of the coupling, it is usually advantageous if at least one and preferably both of the opposed surfaces of the male member and female member tapers in diameter between the high-clearance location and the low-clearance location. For the same reason, it may also be advantageous if elsewhere than at the low-clearance location the diameter of the bore in the female member is increased relative thereto, and/or the diameter of the male member is reduced relative thereto.

It will be appreciated that the multicoil-shaped friction coupling member, which is formed of any suitable material such for instance as steel or an alloy having similar characteristics, must be generally-annular so that it may embrace the male member and be accommodated in the clearance between the male member and the bore in the female member. It is however a much preferred feature of this invention that in the plane normal to the axis of the male and female members to multicoil-shaped friction coupling member shall be of substantially regular polygonal shape. The invention has been made to work with coupling members having as few as three sides, and where the coupling assembly includes very large-sized male and female members it is possible and may be advantageous to use polygonal coupling members with a great many sides. However for the majority of moderately-sized coupling assemblies the polygonal shape should preferably be that of a regular polygon having 5-8 sides, and usually most conveniently one having 6 sides.

While the use of round-section wire to form the multicoil-shaped friction coupling member is not wholly excluded from this invention it has been found difficult to secure a sufficient frictional load with round-section wire without causing deformation thereof sufficient to impair its strength. It is therefore a greatly preferred feature of this invention to employ a multicoil-shaped friction coupling member wherein each of the turns is of non-circular section, preferably either substantially square or rectangular in cross-section.

The means for retaining the friction coupling member at a substantially fixed position relative either to the male member or to the female member can for instance be circlips, retaining rings or other mechanically-equivalent arrangements such as a counterbore, or spigot, with a washer suitably mounted thereon, for example by means of screws.

The retaining means for the friction coupling member will however preferably be a groove or recess formed in either the inner surfaces of the female member or the outer surfaces of the male member, in which the friction coupling member is mounted.

In that case, so as to enable it to be conveniently mounted in the groove, the friction coupling member will advantageously be formed of a resiliently-deformable material and can then be mounted in the coupling assembly by slightly opening the coil, inserting the start of the first turn into the groove and then progressively deflecting and winding the remaining turns into the groove.

The multicoil-shaped friction coupling member has of course inner and outer faces upon each turn, for engagement at the low-clearance location respectively with the male member and with the female member. So as to assist in providing a smooth assembly, particularly along the taper when the male and/or female members taper at the low-clearance location, the relevant faces of the multicoil-shaped friction coupling member can very advantageously be pre-formed with a suitable cross-sectional profile, which both facilitates assembly and dissassembly of the coupling and also promotes frictional inter-engagement between the friction coupling member and the male and/or female member as the case may be.

Figure 3:
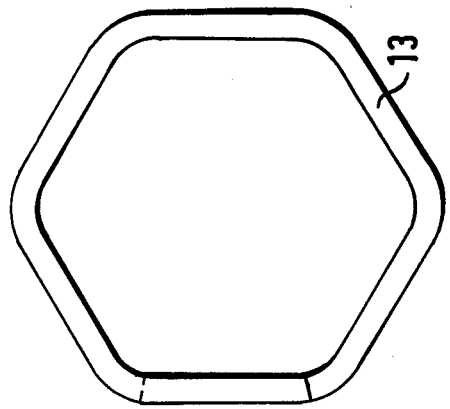
FIG. 3 shows an end-elevational (or plan) view of a preferred hexagonal embodiment of the multicoil-shaped coupling member of FIG. 2.
Figure 2:
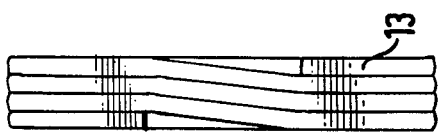
FIG. 2 shows a similar side-elevation view, though not in cross-section and on a reduced scale, of the multicoil-shaped friction coupling member shown in FIG. 1.

Referring now to FIG. 1 of the drawings, the coupling of the invention comprises a female member 10, having a bore therein, and a male member 11, e.g. a shaft, with a clearance therebetween. Accommodated in the clearance between the bore 10 and the shaft 11 is a generally annular, multi coil-shaped coupling member 13, preferably as shown in FIG. 3 having a generally hexagonal shape (in the plane normal to the common axis of the male and female members), which is formed of resiliently-deformable steel or like material. As appears from FIGS. 1 and 2, the multi coil-shaped coupling member may suitably have four turns, but either more of less turns may also be employed successfully. Each of the turns of the multicoil-shaped coupling member 13 is substantially rectangular, and indeed more or less square, in cross-section, as shown in FIG. 1 and also in FIGS. 4-6, but these may take other substantially rectangular cross-sectional forms. The coupling member 13 is mounted in a groove 16 (FIG. 1) in the female member 10, or in a groove 16a (FIG. 4) in the male member 11. The multicoil shaped coupling member is so dimensioned that when the male member 11 and the female member 10 are axially adjusted to the low-clearance location they will be firmly engaged frictionally by the coupling member 13. Where the coupling member 13 is mounted in a recess in the female member 10, as shown in FIGS. 1 and 5, it must be so dimensioned that it is capable of gripping the male member 11 at the low-clearance location after the male member 11 has been correctly adjusted axially relative to the female member 10, and of course must also frictionally-engage the female member. In the case of a polygonal multicoil-shaped coupling member 13 as shown in FIG. 3, all the corners thereof should preferably engage frictionally with the female member at the low-clearance location.

Although not shown in the drawings, the male member 11 and the female member 10 can often with advantage be united elsewhere by a screw-threaded union; and then the multicoil-shaped coupling member 13 is so dimensioned and arranged that it is forced into frictional engagement with non-threaded opposed surfaces of male member 11 and female member 10 as the threaded portions thereof are screwed together. This may be achieved, for example, by suitably tapering, or by varying the diameters, of the male member 11 and female member 10.

Likewise, where as shown for instance in FIGS. 4 and 6 the multicoil-shaped coupling member 13 is located in a groove 16a in the male member 11, it is so dimensioned and arranged that as the male member 11 and female member 10 are moved axially relative to one another the multicoil-shaped coupling member 13 is forced into frictional engagement therewith, in such a way that (in the case of a polygonal multicoil-shaped coupling member 13 as shown in FIG. 3) all the corners thereof engage frictionally with the female member 10 at the low-clearance location. This is ensured by suitably tapering, or otherwise varying, the respective diameters of the male and female members, and thus the clearance therebetween.

At points other than the low-clearance location the diameters of the bore in the female member and of the male member may be varied as desired. Thus on the one hand both members may have essentially the same diameter, so that there is a sliding fit between them, or on the other hand the diameter of the bore in the female member 10 may be increased (as shown at 17 in FIG. 4) and that of the male member 11 may be decreased (as shown at 18 in FIG. 4) so as to facilitate assembly of the coupling. For the same purpose the end or some other selected part of the male member 11 may be tapered, as shown for instance at 19 in FIG. 1.

Referring now more particularly to FIGS. 5 and 6 of the accompanying drawings, the multicoil-shaped coupling member 13 retained in the groove 16a in the female member 10 may have a preformed profile imparted to each of its inner faces adapted to engage the outer surfaces of the male member 11, as shown in FIG. 5 at 21; and the coupling is then assembled by sliding or otherwise axially moving the profiled face 21 of the coupling memeber 13 along a tapered portion 24 of the male member 11. Alternatively, as shown in FIG. 6, the multicoil-shape coupling member 13 may be retained in groove 16a in the male member 11, with a preformed profile imparted to its outer faces adapted to engage the inner surfaces of the bore in the female member 10; and the coupling is then assembled by sliding the profile face 21 along a tapered portion 25 of the female member 10.

I claim:

1. A coupling assembly which comprises in combination a female member including an axially-extending bore, said bore being screw-threaded for part of the length thereof, a male member screw-threaded for part of the length thereof, the screw-threaded parts of said male and female members being inter-engaged and the non-screw-threaded parts of said male and female members defining an annular clearance of tapering radial dimension, a circumferential groove provided in the non-screw-threaded part of one of the external surface of the male member and the internal surface of the female member, a friction coupling member located in said groove, the friction coupling member comprising a strip of resilient material of generally rectangular cross-section preformed into a helical coil of polygonal cross-section, the external corners of which polygonal coil contact the female member and the internal flats of which contact the male member whereby the frictional coupling element frictionally connects the male member to the female member as the clearance between the non-screw-threaded parts of the male and female members is reduced by threading one member relative to the other member.

2. A coupling assembly as claimed in claim 1, in which the friction coupling member is in the form of a substantially regular polygon having from 5 to 8 sides.

3. A coupling assembly as claimed in claim 1, in which at least one of the inner and outer faces of each turn of the friction coupling member are pre-formed with a cross sectional profile which facilitates frictional engagement between said face and the surface of the opposed respective member.

4. A coupling assembly which comprises in combination a female member including an axially-extending bore, a male member for coupling therewith positioned axially within the bore in said female member but spaced therefrom, overlapping parts of the male and female members defining an annular clearance of a tapering radial dimension, and a frictional coupling member comprising a strip of resilient material of generally rectangular cross-section pre-formed into a multi-turn coil having a series of adjacent flats with corners therebetween thereby defining a regular polygonal shape considered in the plane normal to the coil axis, a groove provided in the overlapping part of one of the external surface of the male member and the internal surface of the bore in the female member in which groove said coil is located, external corners of the polygonal multi-turn coil contacting the female member and the internal flats of the multi-turn coil contacting the male member whereby the frictional coupling element frictionally connects the male member and the female member as the clearance between the overlapping parts of the members is reduced by relative axial movement therebetween.

5. A coupling assembly as claimed in claim 4, in which both the inner surfaces of the bore in the female member and the outer surfaces of the male member include screw-threaded portions which are threadedly inter-engaged, and said overlapping parts of said members in the region of said friction coupling member are non-threaded surfaces.

6. A coupling assembly as claimed in claim 4, in which at least one of the opposed surfaces of the male member and the female member tapers in diameter between a high-clearance location and a low-clearance location.

7. A coupling assembly as claimed in claim 6, in which the diameter of the bore in the female member is less at a low-clearance location than at a high-clearance location thereof.

8. A coupling assembly as claimed in claim 6, in which the diameter of the male member is greater at a low-clearance location than at a high-clearance location thereof.

9. A coupling assembly as claimed in claim 4, in which each turn of the friction coupling member has from 5 to 8 flats.

10. A coupling assembly as claimed in claim 4, in which at least one of the inner and outer faces of each turn of the friction coupling member coil is pre-formed with a cross sectional profile which facilitates frictional engagement between said face and the surface of the opposed repsective member.

* * * * *